(No Model.)
G. BROCKERMAN.
THILL COUPLING.
No. 562,883. Patented June 30, 1896.
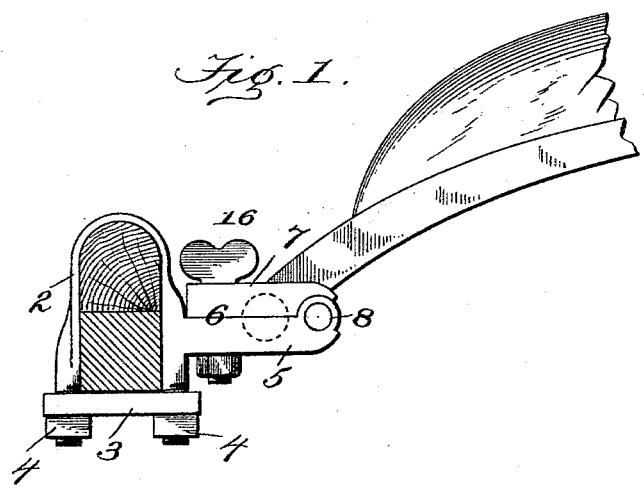
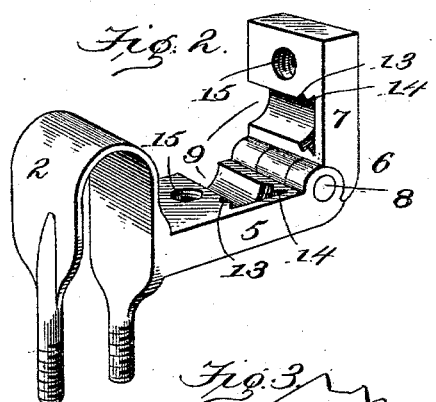
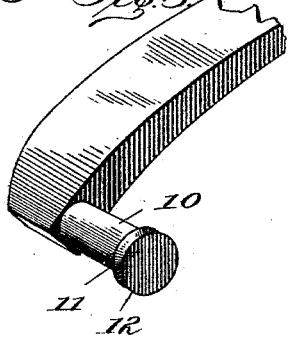
WITNESSES:
Edwin L. Bradford
Ralph Normelle
INVENTOR
Gideon Brockerman
BY
Patrick O'Farrell
ATTORNEY.

UNITED STATES PATENT OFFICE.

GIDEON BROCKERMAN, OF RUSHSYLVANIA, OHIO.

THILL-COUPLING.

SPECIFICATION forming part of Letters Patent No. 562,883, dated June 30, 1896.

Application filed September 7, 1895. Serial No. 561,745. (No model.)

*To all whom it may concern:*

Be it known that I, GIDEON BROCKERMAN, a citizen of the United States of America, residing at Rushsylvania, in the county of Logan and State of Ohio, have invented certain new and useful Improvements in Thill-Couplings, of which the following is a specification, reference being had therein to the accompanying drawings.

My invention relates to thill-couplings or buggy-shaft attachments, and relates to improvements in adjusting and coupling shafts or poles to a buggy or other vehicles, its object being to make a coupling that will be free from noise when in use and quickly and easily changed from shaft to pole.

The improvement will be more fully set forth hereinafter and claimed, and is illustrated in the accompanying drawings, in which—

Figure 1 is a thill-coupling embodying the essential features of my invention. Fig. 2 is a perspective view of the thill-iron pivot-box, open to show the manner in which the thill is coupled. Fig. 3 is a detail view of the thill-iron, showing the cylindrical pin 10.

Referring to the several parts by figures of reference, the numeral 2 represents the bow of the clip which is of the ordinary construction and is secured to the axle in the usual manner by the plate 3 and the nuts 4. Upon the forward arm of the bow of the clip is attached the arm 5, forming the lower half of the thill-iron pivot-box 6. The said thill-box 6 is formed by the lower arm of box 5 and the upper arm 7. Said upper arm 7 is hinged at 8, which enables the upper cover or arm 7 to be thrown in or out of position. Within the half-boxes or arms 5 and 7 and running lengthwise is a semicylindrical groove 9, each above-mentioned groove being equal to a half-segment of the cylindrical pin 10 of the thill-iron. The end of the cylindrical pin 10 is provided with flanges 11 and 12, which fit into corresponding grooves 13 and 14 of the upper and lower arms of the thill-box 6, respectively, thus preventing the pin 10 from slipping out of place. Threaded holes 15 are provided in the said arms which form the thill-box, through which passes the screw-threaded end of the hand-screw or bolt 16, the use of which is to securely fasten the said arms 5 and 7 together, thus forming the thill-coupling.

Having thus described my invention, what I claim as new, and desire to secure by Letters Patent, is—

In combination with the thill-iron, a pivot-box consisting of two sections 5 and 7, the said sections being journaled together by the hinge 8, of the usual construction, the said sections being provided with semicircular grooves 9, for the reception of the bolt or shaft 10, said grooves having recesses 13 and 14, threaded holes 15 passing through the upper and lower sections 5 and 7, respectively a thumb-screw 16, passing through the threaded holes 15, a clip 2, secured to the lower section 5, substantially as set forth.

In testimony whereof I affix my signature in presence of two witnesses.

GIDEON BROCKERMAN.

Witnesses:
W. L. SHOOTS,
CHAS. SMITH.